Figure 1:
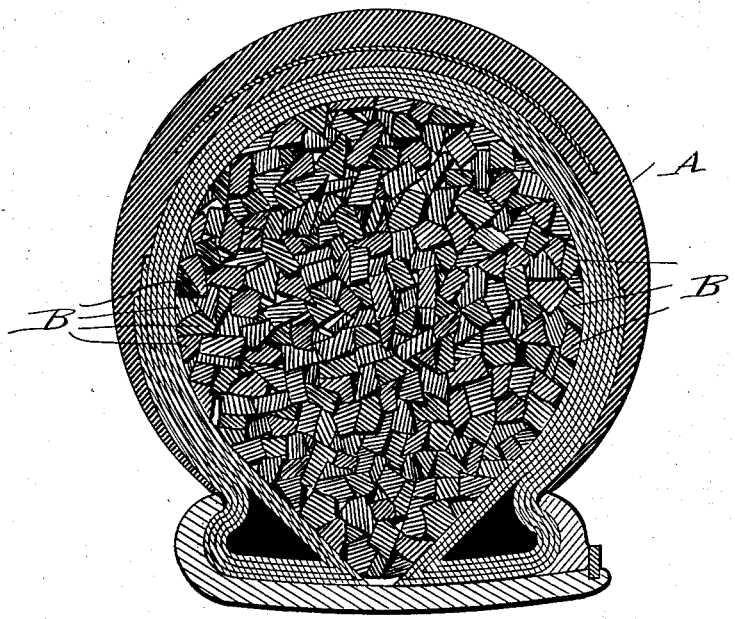

C. S. STATEN.
RESILIENT FILLER FOR ELASTIC VEHICLE TIRES.
APPLICATION FILED JULY 29, 1912.

1,097,824.

Patented May 26, 1914.

Witnesses
Halbert Brown
Elizabeth Griffith

Inventor
Claude S. Staten
By Church & Church
his Attorneys

UNITED STATES PATENT OFFICE.

CLAUDE S. STATEN, OF DALLAS, TEXAS.

RESILIENT FILLER FOR ELASTIC VEHICLE-TIRES.

1,097,824.  Specification of Letters Patent.  Patented May 26, 1914.

Application filed July 29, 1912.  Serial No. 712,091.

*To all whom it may concern:*

Be it known that I, CLAUDE S. STATEN, a citizen of the United States, residing at Dallas, in the county of Dallas and State of Texas, have invented certain new and useful Improvements in Resilient Fillers for Elastic Vehicle-Tires; and I do hereby declare the following to be a full, clear, and exact description of the same, reference being had to the accompanying drawings, forming part of this specification, and to the figures and letters of reference marked thereon.

This invention relates to vehicle tires which embody an elastic or yielding exterior shoe or casing and a resilient internal filler for supporting the casing, thereby dispensing with the necessity of maintaining an internal body of air or gas under pressure.

Many attempts have been made to provide a vehicle tire which would be more reliable than the so-called pneumatic tires, and these attempts have resulted in the production of various filling compositions, usually, however, of gelatinous nature, and of substantially uniform density throughout, although it has been proposed to incorporate in the gelatinous substance other materials of a non-gelatinous but of a yielding character, for instance, comminuted cork. It has also been proposed to form elastic tires with an internal filling material of sponge or cellular rubber, but all the tires developed prior to my present invention have failed to produce a tire having even approximately the resiliency and recovery of a pneumatic tire, or which will remain in a stable condition under hard usage, and for a long period of time.

The solution of the difficulties, in accordance with the present invention, is accomplished by forming the filler of small pieces or particles of elastic material, such, for instance, as india rubber, each in itself substantially solid but assembled in irregular relation, whereby spaces are left between the particles, and by permanently connecting the particles with each other, whereby they are maintained in their relative arrangement and will return to their normal positions and form, after having been subjected to compression or deflection strains.

In addition to the objects above indicated, an object of the invention is to provide a filler in which materials now considered practically waste or having a small commercial value may be utilized as the elastic substance forming the body of the filler, to which ends the filler is formed of small pieces or particles of worn out or discarded inner tubes, shoes and solid rubber vehicle tires, such as are now in common use, which small pieces or particles are assembled in a suitable mold and under proper pressure vulcanized together, whereby they are maintained in their proper relative positions and may be distorted by compressive strains into the spaces between them, but each may exert its maximum resiliency in returning to normal shape and position.

Figure 2:
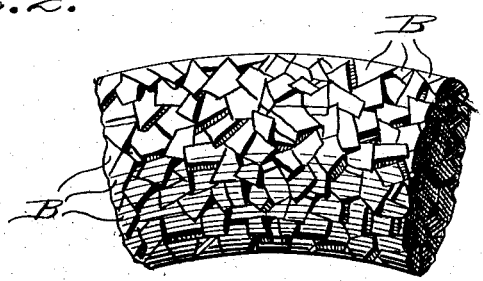

Referring to the accompanying drawing,—Figure 1 is a section through a tire embodying a filler constructed in accordance with the present invention; Fig. 2 is a detail elevation of a small segment of a filler such as is adapted to be inserted in the shoe or casing of an ordinary pneumatic tire.

Like letters of reference in the several figures indicate the same parts.

As shown in Fig. 1, the shoe or casing A is of the usual construction best adapted for resisting frictional wear on the road surface, but may be of any preferred construction, although it should, as shown, be capable of removal from the rim, and of being opened for the insertion of the filler. The filler is designed to occupy the entire internal chamber of the casing and is inserted under sufficient pressure to insure the proper form of the casing under ordinary load stress. It is composed of a multitude of small pieces or particles B, each substantially solid and each inherently elastic. These small particles B are preferably formed by cutting up or comminuting vulcanized india rubber such, for instance, as discarded inner tubes, casings and solid rubber tires in common use at this day. Each piece is solid or practically solid and of appreciable size, its characteristics being distinctly different from sponge rubber, ground rubber or float rubber. The inherent elasticity of the particles may, of course, vary in accordance with the character of the rubber and for heavy vehicles good practice would indicate that the particles should be particles of less resiliency than for light pleasure vehicles; thus, for trucks, tire casings having more or less fiber or fabric therein may be utilized, while for pleasure vehicles inner tubes and more highly resilient portions of the rubber may be utilized. The small particles or pieces are in the manufacture of the filler coated with adhesive material having the capacity to set or permanently unite the particles at their points of contact, and in the preferred process the adhesive material is a rubber solution which may be set by vulcanization to form elastic bonds for permanently connecting the particles. In this preferred process the coated particles are assembled in a suitable vulcanizing mold under a sufficient pressure to secure the desired density of the filler and then subjected to a vulcanizing temperature for a sufficient time to insure the vulcanization of the bonds between the particles throughout the entire filler.

Obviously, in the formation of the filler the use to which it will be put should be taken into consideration in determining the density of the completed filler, thus, for example, fillers designed for heavy vehicles should be vulcanized under sufficient pressure to make the same relatively dense, and when confined in the shoe to offer a resistance to compression which will be practically the equivalent of the resistance offered by a pneumatic tire having an internal pressure great enough to support the loads for which the vehicle is designed.

In applying the filler to ordinary pneumatic tires it is preferred that the usual inner tubes shall be removed, and that the filler inserted in lieu thereof, and that the shoe or casing shall be forced into place under considerable pressure and by means of suitable clamps, whereby the filler will be under initial and normal compression which will give the casing the form and rigidity which it would possess if filled with air or gas under pressure.

With tires as thus constructed, it is found that the expense and annoyance resulting from pinches, punctures and blow-outs are entirely overcome, the durability of the tire or shoe is increased, and the filler may be used in a shoe or casing which is too weak to hold air under pressure. The filler may be utilized for prolonging the lives of shoes or casings and for obtaining from them a mileage far in excess of that which could be obtained were they used for holding air or gas under pressure as in ordinary practice.

Practical results have shown that it is almost impossible to detect the difference between the riding qualities of a car equipped with fillers made in accordance with the present invention and one having ordinary pneumatic tires. Tires of the present invention may be utilized for practically all vehicles on which pneumatic tires are now used, and in addition on vehicles of commercial types now making use of solid rubber tires.

Having thus described my invention, what I claim as new and desire to secure by Letters Patent of the United States, is:

1. A resilient filler for yielding vehicle tires formed of comminuted elastic material, the individual particles being of appreciable size and permanently united in close contact but with irregular air chambers intermediate the particles, by cementitious material which is set while the mass is under pressure.

2. A resilient filler for yielding vehicle tires formed of solid particles of elastic vulcanized rubber, the individual particles being of appreciable size and the mass permanently united with the particles in irregular relation to form intermediate cells by vulcanizable cementitious material which is set while the mass is under pressure.

3. A resilient filler for vehicle tires comprising particles of appreciable size of soft vulcanized rubber pressed into close contact and held together by rubber cement vulcanized while the mass is under pressure.

CLAUDE S. STATEN.

Witnesses:
RAY W. CAMPBELL,
WALTER M. NOLD.